3,150,187
ARYL DIHALOGENACETYL DERIVATIVES
Guido Cavallini, Elena Massarani, and Paolo Mantegazza, Milan, Italy, assignors to Francesco Vismara S.p.A., Casatenovo, Como, Italy, a firm
No Drawing. Filed Jan. 12, 1961, Ser. No. 82,152
Claims priority, application Italy, Feb. 10, 1960, 2,237/60
7 Claims. (Cl. 260—592)

This invention relates to novel dihalogenacetyl compounds and more particularly to aryl mono- and bis-dihalogenacetyl derivatives having the following fundamental formula:

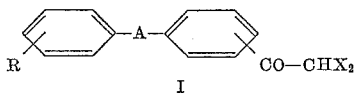
I in which A represents a single valence bond, oxygen, sulfur, sulfinyl (SO), sulfonyl ($SO_2$), methylene ($CH_2$), ethylene ($CH_2CH_2$) or vinylene (CH=CH); X is halogen such as chlorine or bromine; and R is hydrogen, chlorine, methyl, hydroxy, methoxy or a —$COCHX_2$ moiety in which X is as defined above; R is preferably hydrogen or —$COCHX_2$.

The para substituted compounds of Formula I are preferred.

The compounds of Formula I above are generally prepared by direct halogenation, preferably by chlorinatino or bromination, of corresponding mono- and bis-acetyl derivatives of the following formula:

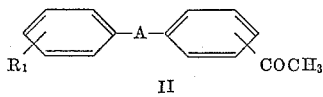
II in which A is as defined above and $R_1$ represents hydrogen, chlorine, methyl, hydroxy, methoxy or a —$COCH_3$ group.

These mono- and bis-acetyl derivatives are known or are easily prepared by acetylation according to the Friedel-Crafts reaction. The mono- and bis-acetyl diphenylsulfoxides and sulfones are alternatively prepared from the corresponding mono- and bis-acetyl diphenylsulfide by oxidation such as for example with hydrogen peroxide.

The compounds of Formula II above are halogenated generally in unreactive organic solvents such as a halogenated solvent for example chloroform, carbon tetrachloride, methylene chloride and the like, or preferably in glacial acetic acid. For example, a large excess of chlorine is bubbled into a solution of the acetyl derivative in the organic solvent for a period of time ranging from one to four hours and at a temperature in the range of from 20 to 60° C. In the case of bromination, a theoretical amount or a slight excess of bromine is slowly added dropwise to the reaction mixture. Generally, from 1–1.5 moles of bromine is employed for every mole of monoacetyl derivative or from 2–2.6 moles of bromine for every mole of bis-acetyl derivative. During the bromination the temperature is preferably maintained in the range of from 25–50° C. and the reaction is completed in several hours.

After the halogenation, the reaction mixture is poured into water and extracted with a polyhalogenated organic solvent such as methylene chloride, chloroform, carbon tetrachloride and others. The solvent is then evaporated from the extract and the product is recrystallized from a solvent such as for example methanol, ethanol, isopropanol, hexane, petroleum ether, benzene, ethyl acetate, dioxane and the like. Following these reaction conditions, yields of between 70 and 90% are obtained usually.

Alternatively, the mono- and bis-dihalogenacetyl derivatives of Formula I are prepared by reacting compounds of the following formula:

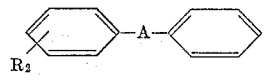
III in which A is as defined above and $R_2$ is hydrogen, chlorine, methyl, hydroxy or methoxy, with one (or two where $R_2$ is hydrogen) mole of a dihalogenacetyl halide (chloride or bromide) under standard Friedel-Crafts reaction conditions (aluminum chloride in carbon disulfide solution).

Of course the stability in the reaction of the particular compound to be prepared will determine which method should be used to give the best yields of dihalogenacetyl derivatives. For example, it is obvious that the mono- and bis-dihalogenacetyl diphenylsulfoxides and sulfones are advantageously prepared by direct halogenation whereas in the case of the stilbene derivatives or nuclear methyl substituted compounds dihalogenacetylation is particularly desirable due to the presence in the molecule of an ethylenic bond or methyl group which are sensitive to the action of halogens.

The novel aryl mono- and bis-dihalogenacetyl compounds corresponding to Formula I above are useful as antibacterial agents. In particular they have bacteriostatic activity and inhibit at very low concentrations the growth of bacteria and especially microbacteria.

The bacteriostatic activity has been tested in cultures of bacteria grown in high nutrient broths and in the presence of serum, conditions the most unfavorable for demonstrating an inhibitory activity, which if noted however is so much more significant. Table I gives the minimal concentration, expressed in γ/cc., for some exemplary aryl mono- and bis-dihalogenacetyl compounds of the present invention which inhibit the growth of *Mycobacterium tuberculosis*, cultivated in Dubos Liquid Medium added to 10% Dubos Serum.

TABLE I

| | γ/cc. |
|---|---|
| 4,4′-bis-dichloroacetyl-diphenylethane | 0.78 |
| 4,4′-bis-dichloroacetylbiphenyl | 1.56 |
| 4,4′-bis-dibromoacetylbiphenyl | 1.56 |
| 4-dichloroacetylbiphenyl | 1.56 |
| 4-dibromoacetylbiphenyl | 1.56 |
| 4-dichloroacetyl-diphenylsulfoxide | 1.56 |
| 4-dichloroacetyl-diphenylether | 3.12 |
| 4-dichloroacetyl-diphenylsulfone | 6.25 |
| 4,4′-bis-dichloroacetyl-diphenylsulfone | 6.25 |
| 4,4′-bis-dibromoacetyl-diphenylsulfone | 6.25 |
| 4-dichloroacetyl-diphenylmethane | 6.25 |
| 4-dichloroacetyl-diphenylethane | 6.25 |

The bacteriostatic activity exhibited by the aryl mono- and bis-dihalogenacetyl compounds is highly selective. The corresponding known monohalogen derivatives tested in the same conditions on *Mycobacterium tuberculosis* demonstrate practically no activity.

In addition to the utility as antibacterial agents described above, the novel aryl mono- and bis-dihalogenacetyl compounds of this invention are useful as intermediates to prepare corresponding aryl mono- and bis-glyoxalyl derivatives. These glyoxalyl derivatives which are antiviral agents are prepared by reacting the corresponding dihalogenacetyl compound with an alkali metal alcoholate such as sodium or potassium methylate or ethylate in a suitable solvent, usually anhydrous lower alcohols, to form the corresponding glyoxalyl acetal derivatives. The reaction is preferably run at about 40–60° C. for from 1–3 hours and the pH of the reaction mixture must be maintained at about pH 7. The pH of the mixture is followed using phenolphthalein. The acetal compound is then hydrolyzed with dilute acid such as 3% sulfuric or hydrochloric acid in a suitable solvent such as acetic acid to form the desired aryl mono- or bis-glyoxalyl compound.

The following examples illustrate the compounds of this invention. Other variations of the structures disclosed herein apparent to one skilled in the art are included in this invention, such as the compounds in which A represents ethylene or vinylene moieties which are substituted with methyl or ethyl groups, or mono-dihalogenacetyl compounds having substituents in both the 4'- and 3'-positions such as 4'-methoxy-3'-chloro.

Example 1

4-acetylbiphenyl (19.6 g.) is dissolved with heating in 200 cc. of glacial acetic acid. The solution thus obtained is cooled slowly and when the temperature is at 50° C. chlorine gas is bubbled into the mixture for one hour. The mixture is poured into water and extracted with methylene chloride. The dried extract is evaporated and the residue taken up in hot ethanol. Cooling crystallizes the 4-dichloroacetylbiphenyl, M.P. 93–94° C.

The 4-dichloroacetylbiphenyl inhibits also the growth of Streptococcus haemolisans at a concentration of 12.5 γ/cc.

Example 2

A solution of 12 g. of 4,4'-diacetylbiphenyl in 150 cc. of chloroform is warmed to 40° C. and a current of chlorine gas is passed into the solution for two hours. At the end of the reaction the mixture is poured into water and repeatedly extracted with chloroform. The combined extracts are dried and the solvent removed by distillation. The residue, taken up in a mixture of boiling benzene and ligroin, crystallizes upon cooling to give 4,4'-bis-dichloroacetylbiphenyl, M.P. 185–186° C.

This compound inhibits also the growth of Micrococcus pyogens var. aureus at a concentration of 6.25 γ/cc.

Example 3

13 g. of 4,4'-diacetyldiphenylmethane, M.P. 93–94° C., obtained by the Friedel-Crafts reaction using diphenylmethane, acetyl chloride and aluminum chloride in standard conditions, is dissolved in 200 cc. of hot anhydrous benzene. Cooled to 40° C., the mixture is treated with chlorine gas for about two hours and then worked up as in Example 2 to yield 4,4'-bis-dichloroacetyldiphenylmethane, M.P. 112–113° C.

Example 4

To a mixture of 8.4 g. of diphenylmethane, 10 g. of aluminum chloride and 50 cc. of carbon disulfide is added slowly at ambient temperature 7.8 g. of dichloroacetyl chloride. The mixture is heated at reflux for about one-half hour, cautiously poured into acidified water and ice and repeatedly extracted with methylene chloride. The combined extracts are treated as in Example 2 to give 4,4'-bis-dichloroacetyldiphenylmethane, identical with that of Example 3.

Example 5

Into a solution of 11.2 g. of 4-acetyldiphenylether in 100 cc. of glacial acetic acid at 40° C. is bubbled chlorine gas for about one hour. The mixture is then poured into water and extracted with methylene chloride. The dried extract is evaporated and the residue taken up in hot ethanol. Cooling crystallizes the 4-dichloroacetyldiphenylether, M.P. 67–69° C.

Example 6

A mixture of 16.8 g. of diphenylmethane, 20 g. of aluminum chloride and 100 cc. of carbon disulfide is treated with 7.1 g. of dichloroacetyl chloride and then refluxed for one-half hour. After cooling the mixture is poured into acidified ice-water and extracted with methylene chloride. The extract is dried and the solvent removed by distillation. The residue is taken up in boiling ethyl acetate. Upon cooling there is separated 4-dichloroacetyldiphenylmethane, which after recrystallization from ethyl acetate melts at 113° C.

Example 7

7.5 g. of dichloroacetyl chloride is added dropwise at ambient temperature to a mixture of 9.1 g. of diphenylethane, 10 g. of aluminum chloride and 50 cc. of carbon disulfide. The mixture thus obtained is refluxed for about one-half hour, cooled, poured into acidified ice-water and then extracted with methylene chloride. The dried extract is distilled under vacuum. The fraction at 150–153° C./0.2 mm. is collected. Crystallization from petroleum ether gives 4-dichloroacetyldiphenylethane, M.P. 51–52° C.

Example 8

13.3 g. of 4,4'-diacetyldiphenylethane is dissolved in 200 cc. of hot glacial acetic acid. Into this clear solution, cooled to 50° C., is passed a current of chlorine gas for about two hours. The mixture is then poured into water and extracted with methylene chloride. The extract is dried and the solvent removed by distillation. The solid residue is taken up in boiling dilute methanol. Cooling gives 4,4'-bis-dichloroacetyldiphenylethane, M.P. 153–154° C. after recrystallization.

This compound is very active against Mycobacterium tuberculosis, inhibiting the growth at a concentration of 0.78 γ/cc.

Example 9

Into a solution of 12.5 g. of 4,4'-bis-diacetyldiphenylether in 100 cc. of glacial acetic acid is passed chlorine gas for two hours. The mixture is poured into water and extracted with chloroform. The dried extract is evaporated and the residue taken up in boiling hexane. Cooling yields 4,4'-bisdichloroacetyldiphenylether, M.P. 118–119° C.

Example 10

To a mixture of 19.6 g. of 4-acetylbiphenyl in 200 cc. of glacial acetic acid is added dropwise 17 g. of bromine. At the end of the addition the mixture is heated at 50° C. for three hours and then cautiously poured into ice-water. The mixture is extracted with methylene chloride and the dried extract is evaporated. The residue is taken up in boiling dilute acetic acid. Cooling gives 4-dibromoacetylbiphenyl, M.P. 128–130° C.

Example 11

To a mixture of 18 g. of stilbene, 20 g. of aluminum chloride and 100 cc. of carbon disulfide is added at ambient temperature 15.1 g. of dichloroacetyl chloride. After the addition (10 minutes) the mixture is heated at reflux for one-half hour. The mixture is then cooled, cautiously poured into ice-water acidified with hydrochloric acid and extracted with methylene chloride. The extract is evaporated and the residue taken up in boiling petroleum ether; cooling precipitates 4-dichloroacetylstilbene, M.P. 155–156° C.

Example 12

To a mixture of 9 g. of stilbene, 20 g. of aluminum chloride and 100 cc. of carbon disulfide is added slowly at ambient temperature 15.1 g. of dichloroacetyl chloride and the mixture is then heated at reflux for one hour. The cooled mixture is poured into ice-water containing hydrochloric acid and extracted with chloroform. The extract is evaporated and the residue taken up in boiling hexane; cooling precipitates 4,4'-bis-dichloroacetylstilbene.

Example 13

12 g. of 4,4'-diacetylbiphenyl is dissolved in 150 cc. of chloroform and to the mixture is added dropwise with stirring 17 g. of bromine. After the addition is complete the mixture is refluxed for two hours, poured into water and extracted with chloroform. The dried extract is taken to dryness by distillation and the residue is taken up in boiling dilute acetic acid. Cooling precipitates 4,4'-bis-dibromoacetylbiphenyl, M.P. 169–170° C.

*Example 14*

To a mixture of 19.6 g. of diphenylsulfide, 100 cc. of carbon disulfide and 13.3 g. of aluminum chloride cooled to 5° C. is added dropwise 14.74 g. of dichloroacetyl chloride, maintaining the temperature at 5–10° C. The mixture is stirred for five hours, then poured into acidified ice-water and extracted with methylene chloride. The extract is washed with water, dried and evaporated. The residue is distilled under vacuum and two fractions are obtained:

I. B.P. 96–100° C./0.2 mm.-recovered diphenylsulfide.
II. B.P. 170–189° C./0.2 mm.-4-dichloroacetyldiphenylsulfide.

The product solidifies and after recrystallization from hexane melts at 67° C.

*Example 15*

12.3 g. of 4-acetyldiphenylsulfoxide, obtained from the corresponding diphenylsulfide by mild oxidation with one mole of hydrogen peroxide, is dissolved in 100 cc. of hot acetic acid. The solution is cooled to 40° C. and chlorine gas is passed in for about four hours. Working up as described in Example 1 yields 4-dichloroacetyldiphenylsulfoxide, M.P. 98° C.

*Example 16*

20 g. of 4-acetyldiphenylsulfone (obtained by treating 4-acetyldiphenylsulfide at ambient temperature with an excess of hydrogen peroxide diluted in acetic acid and then with water to complete the precipitation) is dissolved in 200 cc. of glacial acetic acid. The mixture is cooled to 50° C. and chlorine gas in introduced for four hours. Working up as described in Example 1 yields 4-dichloroacetyldiphenylsulfone, M.P. 101–102° C.

*Example 17*

Into a solution of 6.04 g. of 4,4'-diacetyldiphenylsulfone, prepared by oxidation of the sulfide with an excess of hydrogen peroxide, in 500 cc. of acetic acid is slowly added a solution of 12.8 g. of bromine in 20 cc. of acetic acid, maintaining the temperature at 30–40° C. The mixture is allowed to stand at ambient temperature overnight and then is poured into water. The precipitate is filtered off, dissolved in cold dioxane and with the addition of water 4,4'-bis-dibromoacetyldiphenylsulfone crystallizes. After recrystallization from aqueous dioxane the product melts at 195° C.

*Example 18*

A solution of 20 g. of 2,2'-diacetylbiphenyl in 400 ml. of glacial acetic acid is prepared and cooled to 50° C. Chlorine gas is bubbled into the mixture for one hour. The mixture is treated with water and extracted with methylene chloride. The dried extract is then evaporated to give 2,2'-bis-dichloroacetylbiphenyl, M.P. 167–170° C.

*Example 19*

Employing 20 g. of 3,3'-diacetylbiphenyl as in Example 18 yields the corresponding 3,3'-bis-dichloroacetylbiphenyl.

*Example 20*

A mixture of 7.5 g. of α,β-diethylstilbene and carbon disulfide is acylated using 2 moles of dichloroacetyl chloride and aluminum chloride as described above in Example 12 to give 4,4'-bis-dichloroacetyl-α,β-diethylstilbene.

*Example 21*

A mixture of 5.4 g. of 4,4'-diacetyl-α,β-diethyldiphenylethane is chlorinated as described above in Example 8 to give 4,4'-bis-dichloroacetyl-α,β-diethyldiphenylethane.

*Example 22*

A solution of 10 g. of 4-acetyl-4'-methoxybiphenyl in 100 cc. of glacial acetic acid at 50° C. is chlorinated as described in Example 1 to yield similarly 4-dichloroacetyl-4'-methoxybiphenyl. M.P. 123–124° C.

*Example 23*

A solution of 8.5 g. of 4-acetyl-4'-hydroxybiphenyl (obtained by demethylation of the corresponding 4-acetyl-4'-methoxybiphenyl) in 100 cc. of glacial acetic acid at 50° C. is chlorinated as described in Example 1 to yield similarly 4-dichloroacetyl-4'-hydroxybiphenyl.

*Example 24*

A solution of 10 g. of 4-acetyl-4'-chlorobiphenyl in 100 cc. of glacial acetic acid at 50° C. is chlorinated as described in Example 1 to give upon similar workup 4-dichloroacetyl-4'-chlorobiphenyl.

*Example 25*

A mixture of phenyl-p-tolylsulfone and carbon disulfide is acylated using dichloroacetyl chloride and aluminum chloride as described above to give 4-dichloroacetyl-4'-methyldiphenylsulfone.

*Example 26*

The following example illustrates the utility of the dihalogenacetyl compounds of this invention as intermediates to prepare glyoxals useful as antiviral agents.

To a solution of 13.25 g. of 4-dichloroacetylbiphenyl (prepared as in Example 1) in 150 cc. of hot anhydrous methanol is added a solution of 2.3 g. of sodium in 50 cc. of methanol. After two hours at 45–50° C. the reaction mixture is neutral to phenolphthalein. The sodium chloride is filtered off and the solvent is completely evaporated. The residue (4-biphenylylglyoxal methyl acetal) is dissolved in acetic acid at 50° C. and the solution thus obtained is filtered with carbon black. To this warm solution is added 5 cc. of 3% sulfuric acid and then water to complete the precipitation. After cooling the precipitate is filtered off and washed with water until neutral. The precipitate is recrystallized from dilute ethanol to give pure 4-biphenylylglyoxal, M.P. 119–121° C.

*Example 27*

5 g. of 2,2'-diacetylbiphenyl, dissolved in 150 cc. of acetic acid, is treated with a solution of bromine in acetic acid as in Example 17 to give 2,2'-bis-dibromoacetylbiphenyl, M.P. 182–183° C.

Similarly, 2-acetylbiphenyl is brominated to form 2-bromoacetylbiphenyl. By substituting in this reaction chlorine for bromine the corresponding 2-chloroacetylbiphenyl is obtained at M.P. 173–175° C.

*Example 28*

A solution of 3 g. of 4-acetyl-4'-methoxy-3'-chlorobiphenyl in 80 cc. of glacial acetic acid is chlorinated as in Example 1 to yield similarly 4-dichloroacetyl-4'-methoxy-3'-chlorobiphenyl, B.P. 220° C./1 mm.

*Example 29*

Following the procedure of Example 5, a solution of 2 g. of 4-acetyl-4'-chlorodiphenylether in 25 cc. of glacial acetic acid is chlorinated to give 4-dichloroacetyl-4'-chlorodiphenylether, M.P. 70–71° C.

In the same manner 4,4'-diacetyldiphenylsulfone, prepared as in Example 17, yields the corresponding 4,4'-dichloroacetyldiphenylsulfone melting at 202–203° C.

What is claimed is:

1. A chemical compound selected from the group consisting of compounds having the formulas:

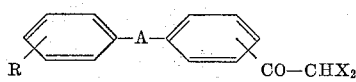

and

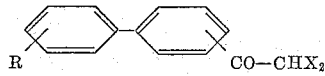

in which A is a member selected from the group consisting of oxygen, sulfur, sulfinyl, sulfonyl, methylene, ethylene, α,β-diethyl-ethylene, vinylene and α,β-diethyl-vinylene; X is a member selected from the group consisting of chlorine and bromine; and R is a member selected from the group consisting of hydrogen and —$COCHX_2$, where X is as defined above.

2. A chemical compound having the formula:

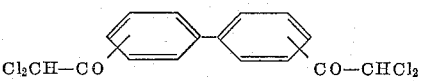

3. 4,4'-bis-dichloroacetylbiphenyl.
4. 4,4'-bis-dichloroacetyldiphenylethane.
5. 4-dichloroacetylbiphenyl.
6. 4-dichloroacetyldiphenylsulfoxide.
7. 4-dichloroacetyldiphenylether.

References Cited in the file of this patent

UNITED STATES PATENTS

| | | |
|---|---|---|
| 2,107,905 | Ralston et al. | Feb. 8, 1938 |
| 2,116,893 | Heisel | May 10, 1938 |
| 2,516,098 | Bambas | July 25, 1950 |

FOREIGN PATENTS

| | | |
|---|---|---|
| 114,032 | Austria | Mar. 15, 1929 |